(12) United States Patent
Aubert et al.

(10) Patent No.: US 8,153,928 B2
(45) Date of Patent: Apr. 10, 2012

(54) METHOD AND INSTALLATION FOR LASER CUTTING/WELDING

(75) Inventors: Philippe Aubert, Paris (FR); Guillaume De Dinechin, Issy les Moulineaux (FR)

(73) Assignee: Commissariat a l'Energie Atomique, Paris (FR)

( * ) Notice: Subject to any disclaimer, the term of this patent is extended or adjusted under 35 U.S.C. 154(b) by 1049 days.

(21) Appl. No.: 12/088,292

(22) PCT Filed: Oct. 4, 2006

(86) PCT No.: PCT/EP2006/067024
§ 371 (c)(1),
(2), (4) Date: Mar. 27, 2008

(87) PCT Pub. No.: WO2007/039619
PCT Pub. Date: Apr. 12, 2007

(65) Prior Publication Data
US 2008/0219305 A1   Sep. 11, 2008

(30) Foreign Application Priority Data

Oct. 5, 2005   (FR) ...................................... 05 53001

(51) Int. Cl.
*B23K 26/00* (2006.01)
(52) U.S. Cl. .......... 219/121.63; 219/121.67; 219/121.84
(58) Field of Classification Search .............. 219/121.63, 219/121.65, 121.84, 121.67, 121.64, 121.66, 219/121.72
See application file for complete search history.

(56) References Cited

U.S. PATENT DOCUMENTS

| 2,756,311 | A | * | 7/1956 | Persson et al. ................... 219/74 |
| 4,000,392 | A | * | 12/1976 | Banas et al. ............. 219/121.63 |
| 4,303,824 | A | * | 12/1981 | Morgan et al. ........... 219/121.84 |
| 4,324,972 | A | * | 4/1982 | Furrer et al. ............. 219/121.84 |
| 4,469,930 | A | * | 9/1984 | Takahashi ................ 219/121.72 |
| 4,707,585 | A | | 11/1987 | Monteith et al. |
| 5,142,119 | A | * | 8/1992 | Hillman et al. .......... 219/121.64 |
| 5,293,023 | A | * | 3/1994 | Haruta et al. .............. 219/121.6 |
| 5,662,762 | A | * | 9/1997 | Ranalli ......................... 156/707 |
| 5,756,962 | A | * | 5/1998 | James et al. ............. 219/121.75 |
| 5,763,854 | A | * | 6/1998 | Dittman et al. .......... 219/121.63 |
| 5,961,748 | A | * | 10/1999 | Ono et al. ...................... 148/333 |

FOREIGN PATENT DOCUMENTS
CN       1640606 A     7/2005
* cited by examiner

*Primary Examiner* — M. Alexandra Elve
(74) *Attorney, Agent, or Firm* — Oblon, Spivak, McClelland, Maier & Neustadt, L.L.P.

(57) ABSTRACT

A laser cutting/welding installation including a laser head configured to deliver a laser beam and a cooling device for cooling the laser head is disclosed. The laser beam is designed to generate a hot spot on a workpiece by incidence thereon and form a solder bath from a portion of the workpiece affected by the hot spot. The cooling device includes a vortex tube with a compressed gas inlet supplied with a compressed gas, a cold gas outlet, and a hot gas outlet. The vortex tube cold gas outlet is plumbed directly to an interior volume of the laser head and configured to deliver a cold gas directly to the interior volume of the laser head for cooling thereof.

20 Claims, 5 Drawing Sheets

METHOD AND INSTALLATION FOR LASER CUTTING/WELDING

TECHNICAL FIELD

The technical field of the invention is that of high-power laser cutting and welding methods and installations.

The invention is particularly applicable in the field of laser cutting/welding of materials having significant thicknesses, in particular materials used in installations in the nuclear industry, the naval industry, or the automobile or aeronautic industries.

In this respect, it is noted that an even more privileged application of the invention concerns laser cutting of materials in the framework of dismantling of nuclear installations.

PRIOR ART

In this field of cutting/welding pieces by high-power laser, the installations known by the state of the art are typically cooled with the help of a device using water as the cooling liquid.

However, this type of water cooling device can be difficult to implement for some applications, in particular when the installation is designed to be used under "construction conditions". Indeed, water cooling is limiting in that it requires a complex installation integrating pump-type elements and sealed circuits. Moreover, it is noted that possible leaks can have serious consequences for the construction site.

Furthermore, this water cooling device can even be extremely limiting when the laser cutting/welding installation is designed to be used on a nuclear site, in particular during dismantling of this type of installation, since water then constitutes a fluid creating waste to be processed.

It has also been noted that when the laser head of the cutting/welding installation has not been cooled during its implementation, it can quickly reach critical temperatures, often higher than 50° C., these temperatures naturally being more significant when the laser power used is greater.

Because of this, it can clearly be seen that uncooled cutting/welding installations can only achieve high cutting/welding performances when they are capable of delivering a strong laser power, as this is likely to cause heating of the laser head, which can lead to its deterioration.

This drawback is therefore particularly limiting for installations requiring the use of high powers for a long period of time, as is generally the case for applications of the "construction site" cutting/welding type, such as dismantling nuclear installations, usually requiring long-lasting interventions with high power often exceeding 4 kW.

SUMMARY OF THE INVENTION

The aim of the present invention is therefore to propose a laser cutting or welding installation capable of limiting the risks of heating of the laser head, and able to be used without constraint in all types of applications, including nuclear.

To do this, the invention concerns a laser cutting/welding installation comprising a laser head capable of delivering a laser beam designed to generate a solder bath, the installation also comprising a device for cooling the laser head. According to the invention, the cooling device comprises at least one vortex tube supplied with compressed gas, this vortex tube having at least one cold gas outlet connected to the laser head such that the cold gas penetrates inside this laser head to cool it, as well as at least one hot gas outlet.

Thus, the cooling device used integrates one or several vortex tubes whereof the known operating principle is relatively simple. Indeed, a compressed gas is radially injected into a device made for example in aluminum or steel, to be able to be divided into two distinct gas jets. Within this device, a transfer of kinetic energy is generated in the form of heat between the two gas jets, which makes it possible on one hand to have a jet of hot gas escaping through a hot gas outlet, and on the other hand to have a jet of cold gas escaping through a cold gas outlet opposite the aforementioned outlet. These two outlets are generally located at both ends of the vortex tube, and can each have bifurcations in order to constitute several hot gas outlets or several cold gas outlets.

With the presence of this type of cooling device acting on the laser head, heating of this head can be greatly minimized during operation of the installation, which makes it possible to implement higher laser powers over a long period without risk of deteriorating this same head. Applications of the "construction" cutting/welding type such as those relative to the dismantling of nuclear installations are therefore easily done with the installation according to the invention.

The advantage resulting from the preceding resides in the fact that the cutting/welding performances can be increased, these being able to translate to increased cutting/welding speed, and/or satisfactory cutting/welding of pieces having larger thicknesses which can easily reach 100 mm, and/or greater tolerance in the relative positioning between the first head and the pieces to be cut/welded, the latter characteristic being particularly advantageous in the framework of industrial cutting under "construction conditions".

Moreover, another advantage of the present invention concerns the use of compressed gas as cooling fluid. The supply of the vortex tube is therefore very easy and, above all, the cooling device no longer integrates water, the incompatibility of which with nuclear applications previously constituted a major drawback.

An additional advantage of the installation according to the invention concerns the presence of a hot gas jet leaving the vortex tube, which can be used judiciously in cooperation with the solder bath in order to further increase the cutting/welding performance.

Indeed, when the installation is designed for laser cutting, the hot gas leaving via the hot gas outlet from the vortex tube is preferably designed to ensure the expulsion of molten metallic particles outside the solder bath created by the laser beam. As a result, this hot gas ejected from the vortex tube can advantageously be added to a jet of working gas already provided on the cutting installation, which makes it possible to improve the expulsion of particles outside the trench, and therefore to increase cutting performances. It could also, of course, be used as the sole source of working gas without going outside the scope of the invention.

Moreover, when the installation is designed for laser welding, the hot gas leaving the hot gas outlet of the vortex tube is preferably designed to ensure preheating of the pieces to be welded, and/or protection of the solidified solder bath against ambient air. In the first case, the hot gas is preferably ejected at the front of the laser beam in relation to the direction of welding, in order to play its role of preheating the pieces designed to be welded, and therefore make it possible to obtain increased welding performance. However, in the second case, the hot gas is preferably ejected at the rear of the laser beam in relation to the direction of welding, and even more preferably at the rear of the liquid solder bath. Indeed, this involves protecting the metal coming from the solder bath which has just solidified, and is in the process of cooling, from the ambient air, in order to avoid in particular nitriding and oxidation of the welded metal. An additional interest is that the ejected hot gas makes it possible to act on the thermal welding cycles, unlike with cold gas, which is beneficial for the solidification microstructures, and which can, for example, translate to a decrease in the hardness of the welding seam. Because of this, attaching this hot air jet to the rear of the laser beam and of the solder bath makes it possible to substantially increase the weldability of hard-to-weld materials, such as those known for encountering problems of excessive hardness of the welding seam.

Preferably, the cooling device comprises a plurality of vortex tubes supplied with compressed gas. In this type of configuration, the vortex tubes can be mounted either in parallel, or in cascade where the hot gas outlet of one vortex tube supplies the inlet of a vortex tube directly consecutive thereto.

It is noted that in general, the cascade assembly is primarily sought in order to have a hot air flow at high temperature, which makes it well suited to laser welding installations in which it then enables very satisfactory preheating of the pieces to be welded. Moreover, the parallel assembly is essentially adopted in order to have a significant hot gas/cold gas flow, which makes it well suited to laser welding installations in which the large hot air flow then enables very satisfactory expulsion of the metallic particles outside the trench.

Nevertheless, it is noted that these two types of assembly of the vortex tubes are naturally imagined for both the cutting and welding applications, without going outside the scope of the invention.

Preferably, the vortex tube used is designed so as to produce approximately 80% cold gas and approximately 20% hot gas, these values having been chosen to ensure optimal cooling of the laser head, whether said head is designed to be used for cutting or welding.

Preferably, the vortex tube is designed so as to produce hot gas at a temperature approximately 80 to 100° C. higher than an inlet temperature of the compressed gas, and to produce cold gas at a temperature approximately 20° to 30° C. lower than the inlet temperature of the compressed gas.

As stated above, when the installation is designed for laser cutting, the hot gas leaving the hot gas outlet of the vortex tube is preferably designed to ensure the expulsion of molten metallic particles outside a solder bath created by the laser beam. In this case, one can provide that the hot gas outlet of the vortex tube is connected to the laser head such that the hot gas is ejected therefrom by a nozzle tip belonging to this same head. Thus, the aforementioned nozzle tip can also be passed through by the laser beam, implying that the ejection axis of the hot gas and the axis of the laser beam are then preferably combined.

It is noted that the hot gas outlet of the vortex tube could alternatively be connected to a head other than the laser head, without going outside the scope of the invention.

For laser cutting, the compressed gas used is preferably compressed air. However, one can use any known type of working gas to play this role of expelling molten metallic particles outside the trench.

Lastly, it is noted that one advantage related to the use of a hot gas to ensure, in part or in whole, the expulsion of the molten particles outside the trench resides in the fact that the "hot" nature of this gas strongly limits the cooling effect of the molten metallic particles, which leads to substantially decreasing the risks of blockage of the progress of cutting.

As also stated above, when the installation is designed for laser welding, the hot gas leaving the hot gas outlet of the vortex tube can be designed to ensure preheating of the pieces to be welded. In this case, the hot gas outlet of the vortex tube is located at the front in relation to the laser head, in a direction of welding.

The hot gas coming out of the hot gas outlet of the vortex tube can alternatively be designed to ensure protection of the solidified solder bath against ambient air. The hot gas outlet of the vortex tube is then located in the rear in relation to the laser head, in a direction of welding, and preferably in the rear in the relation to the solder bath generated by the beam.

Naturally, as mentioned above, the hot gas can also play both of the aforementioned roles, by providing several hot gas outlets on the vortex tube in question.

For laser welding, the compressed gas used is preferably an inert gas or a gas comprising oxygen and/or carbon dioxide, this type of gas being called "active" and being chosen according to the nature of the materials to be welded, so as to be able to protect these materials as much as possible from ambient air during the solid cooling phase after welding.

Moreover, the invention also concerns a laser cutting/welding method implemented with the help of an installation as described above, namely by performing the cutting/welding with the help of the aforementioned cooling device.

Other characteristics and advantages of the invention will appear in the detailed and non-limiting description below.

BRIEF DESCRIPTION OF THE DRAWINGS

This description will be given with regard to the appended drawings, in which.

DETAILED DESCRIPTION OF A PREFERRED EMBODIMENT

Figure 1:
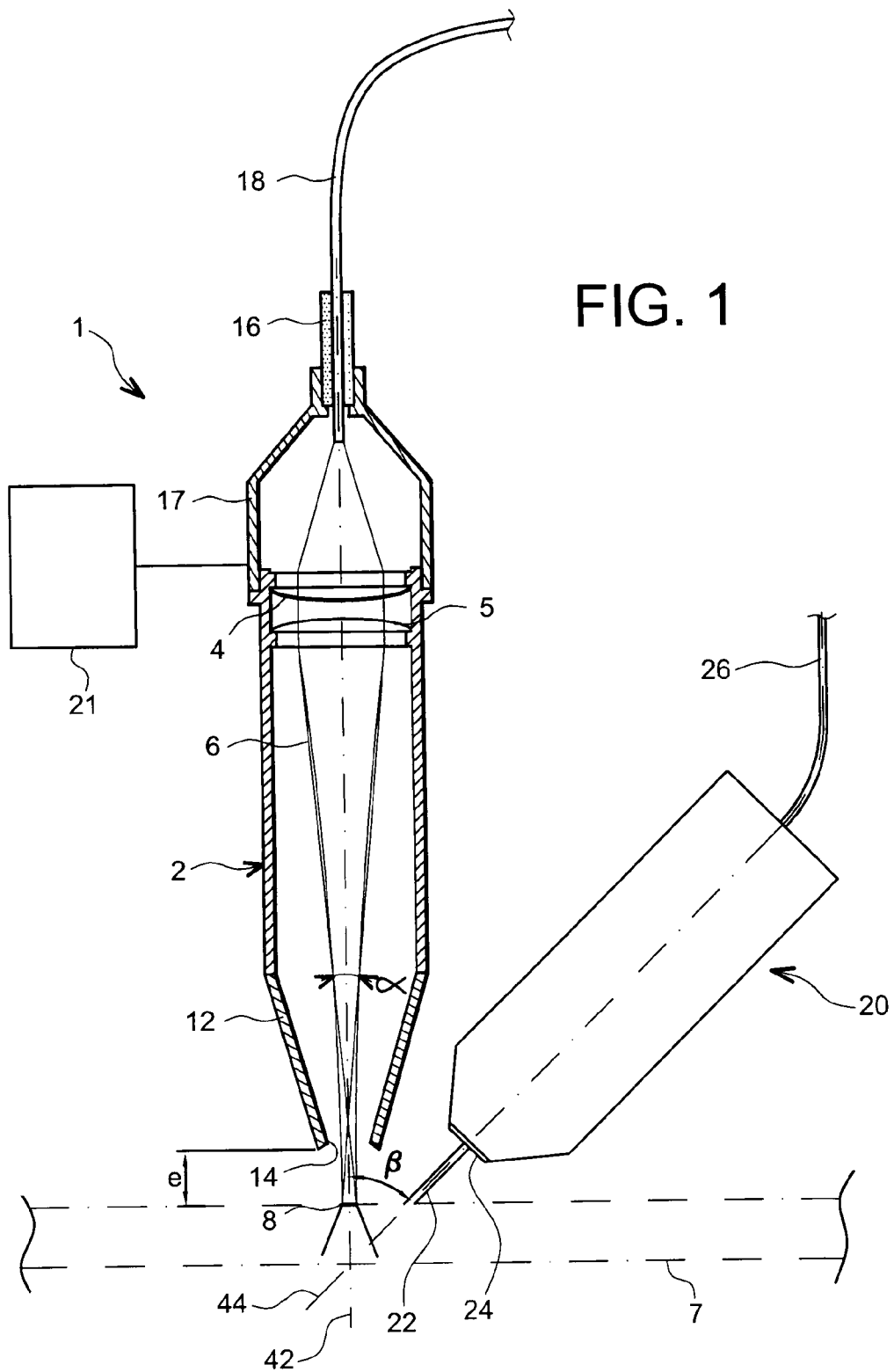
FIG. 1 illustrates a partial front elevation of a cutting installation according to a preferred embodiment of the present invention.

In reference to the figures, it will be described a laser cutting/welding installation 1 of the Nd-YAG laser type, chosen in particular due to the advantages related to the transport of a laser beam 6 by optical fibers or also due to the advantages with regard to the possibility of having a better interaction between this laser beam 6 and a piece to be cut/welded (referenced 7). Let us note, however, that it would also be quite suitable to use a $CO_2$ laser to implement the invention.

The invention is designed to be used for pieces of varied thicknesses, and more specifically for pieces having thicknesses greater than approximately 50 mm and which can exceed 100 mm. In any case, the invention proposes a laser cutting/welding device for pieces having significant thicknesses, the limited commonly allowed by those skilled in the art being 10 mm.

Likewise, the power delivered to the device 1 is between approximately 4 and 6 kW, this value interval corresponding to the power typically used in the devices of the prior art, and quite suitable for "construction"-type working conditions, such as those encountered in the framework of the privileged, but non-limiting application of dismantling nuclear installations.

In reference first to FIG. 1, shown is a part of a laser cutting installation 1 presented in the form of one preferred embodiment of the present invention, this installation comprising a first head 2, called laser head, having a substantially cylindrical shape and comprising an external diameter of approximately 30 mm and a length of approximately 250 mm, for an administered power in the vicinity of 6 kW.

Inside the head are found optical means 4, 5, preferably formed by a collimator lens 4 and a convergence lens 5, these lenses being located facing each other.

The optical means 4, 5 are passed through by the laser beam 6, transported by an optical fiber 18 mechanically connected on the first head 2. The fiber 18 is therefore supported by a mechanical assembly 16, 17 comprising a connector 16 surrounding the fiber 18 and a mechanical interface 17 bearing this connector 16. The mechanical interface 17 is also coupled to the head 2 so as to position the laser beam 6 coming out of the cable 18 across from the optical means 4, 5.

Preferably and in particular to limit the bulk of the head 2, the laser beam 6 extends inside the mechanical assembly over a distance of approximately 40 to 60 mm. Of course, this value interval is not limiting and can be modified by one skilled in the art.

The optical means 4, 5 passed through by the laser beam 6 produce a hot spot 8, this hot spot 8 corresponding approximately to a width of a trench formed in a piece to be cut 7 during use of the device 1. The hot spot 8 preferably has a diameter larger than 1.5 mm, and more preferably in the vicinity of 2 mm. This in fact corresponds to the values required to ensure quality cutting for pieces having a thickness of up to 100 mm, or even beyond this value.

The head 2 also comprises a first nozzle tip 12 able to allow the laser beam 6 to pass through an outlet orifice 14, this outlet orifice 14 having a diameter slightly larger than the diameter of the hot spot 8.

The head 2 receives the laser beam 6 coming from the optical fiber 18, this laser beam 6 passing through the optical means 4, 5 located inside the head 2. The laser beam 6, leaving these optical means 4, 5, comprises an angle of convergence $\propto$ less than approximately 10°. Preferably, the angle of convergence $\propto$ is between 5° and 9°. With such an angle of convergence, the constraints related to the gap "e" between the piece to be cut and the head 2 are substantially decreased. One then obtains very good cutting quality for a gap between approximately 0.5 and 20 mm, or even for a gap of a larger size which can exceed 50 mm with the implementation of the second head of the installation which will be described below.

Moreover, it is noted that the quality of the laser beam generated influences the dimensioning of the cutting installation, as well as its performance. Thus, two particularly interesting combinations have been discovered in terms of the depth of field and power density obtained. Firstly, this involves a combination between a laser source of the flash bulb pumped bar YAG type, and an optical fiber diameter in the vicinity of 600 µm. The other combination concerns a laser diode pumped disc YAG type laser source, and an optical fiber diameter in the vicinity of 200 µm. In both cases, a power density of more than 1.3 kW/mm$^2$ was advantageously obtained over a depth of field exceeding 50 mm, at welding speeds in the vicinity of 100 to 150 mm/min.

In this preferred embodiment, the installation 1 comprises a second head 20 separate from the first, which can therefore be moved and undergo maintenance operations independently of the first head 2. In other words, it is preferably provided that the two heads 2, 20 can each be removed from the installation, without the other head having to be moved.

The second head 20, also called gas ejection head, allows the ejection of the working gas in the direction of the solder bath created by the laser beam coming out of the first head 2.

The jet of working gas 22 therefore leaves the head 20 via a nozzle tip 24, after having been brought toward this same head by a conduit 26 connected to a gas source (not shown), belonging to the working gas ejection means of the installation 1.

Preferably, ejection is done at a pressure below 10 bars, and even more preferably between 1 and 6 bars. The reason for using this type of pressure is to avoid molten metallic particles located in the trench being cooled and blocked prior to their expulsion from the trench. It is therefore necessary to apply weak pressures, still enabling the gas to play its role of ejecting molten metallic particles.

The working gases likely to be used are those known by those skilled in the art, such as inert gases like nitrogen, helium, argon, or gasses called active, integrating oxygen and/or carbon dioxide.

As will be stated in more detail below, it is noted that the two heads 2 and 20 are able to be disconnected from the cutting installation 1. Disconnection can be done using means driven remotely, as known from the prior art.

Furthermore, the specificity of the invention resides in the presence of the vortex tube cooling device 21. This device 21, which is coupled to the laser head 2, will be described in detail below.

Figure 2:
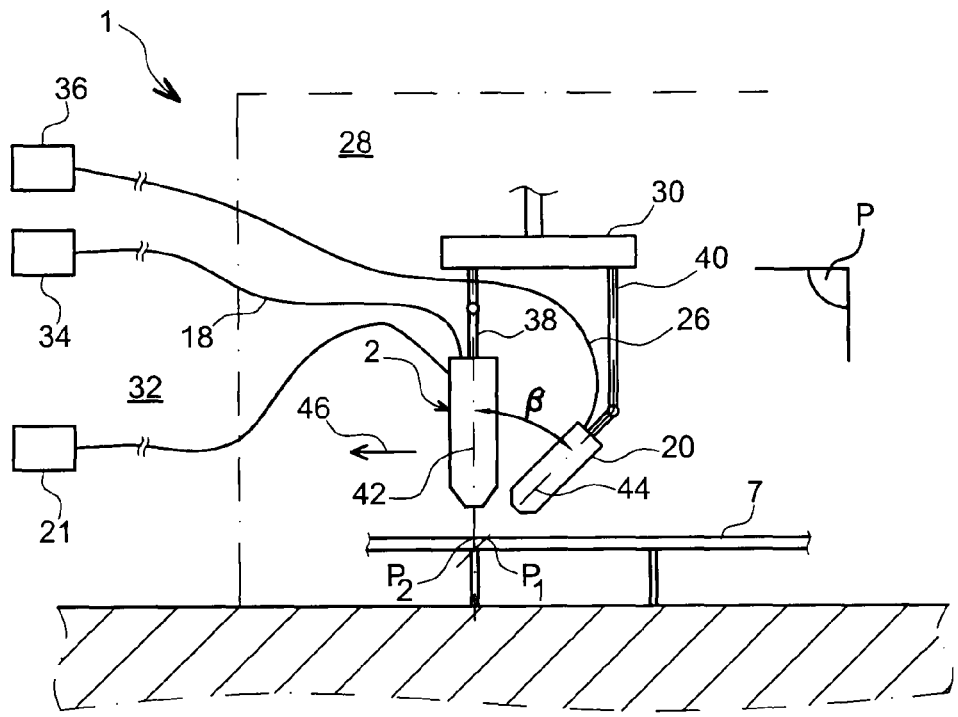
FIG. 2 illustrates a simplified view of the cutting installation shown in FIG. 1.

In reference now to FIG. 2, showing the cutting installation more completely, one can see that part of this installation can be carried onto the construction site in question, this site assuming the form of an irradiation location 28 in the framework of dismantling nuclear installations.

This part globally integrates a carrier 30 able to be driven remotely, therefore from a non-irradiating location 32 in which the laser source 34 connected to the optical fiber 18, as well as the source of working gas 36 connected to the conduit 26, re also preferably located. It also, of course, comprises the two heads 2, 20, which are connected to the carrier 30 via the manipulator arms 38, 40, respectively, these arms also being drivable remotely from the location 32. These two arms not only make it possible to adjust the position of each of the heads 2, 20 in relation to the piece to be cut 7, but also to adjust their relative positions.

As visible in FIG. 2, one can see that the first and second heads 2, 20 are arranged such that the laser beam leaves the first head 2 along a laser beam axis 42 which is at an angle in relation to a gas ejection axis 44 along which the working gas is ejected in the second head 20. More precisely, one typically tries to ensure that the axis of the laser beam 42 crosses the piece to be cut 7 orthogonally. Thus, the gas ejection axis 44 is therefore at an angle in relation to the direction orthogonal to the piece 7, but is preferably arranged in a plane P also integrating the laser beam axis 42 and the rectilinear trench created by the beam, when such a trench is created. Moreover, as shown in FIG. 2, it is provided that in this plane P parallel to the direction of cutting 46 and going through the two axes 42, 44, these two axes are tilted in relation to each other at an angle β between 20° and 30°. This value allows optimal ejection of the metallic particles outside the trench, and is preferably obtained by placing the second head 20 behind in relation to the first head 2 in the direction of cutting 46, and by acting such that the tilted axis 44 extends toward the front while coming closer to the piece to be cut.

However, although this axis 44 is at an angle, which implies that the working gas jet comes closer to the laser beam, one can provide that the point of impact P1 of the working gas on the piece to be cut 7 is located behind the point of impact P2 of the laser beam on this same piece 7, as is clearly visible in FIG. 2. However, it is noted that in order to obtain optimal cutting performance, one provides an adjustment implying identity between the points of impact P1 and P2.

Figure 3:
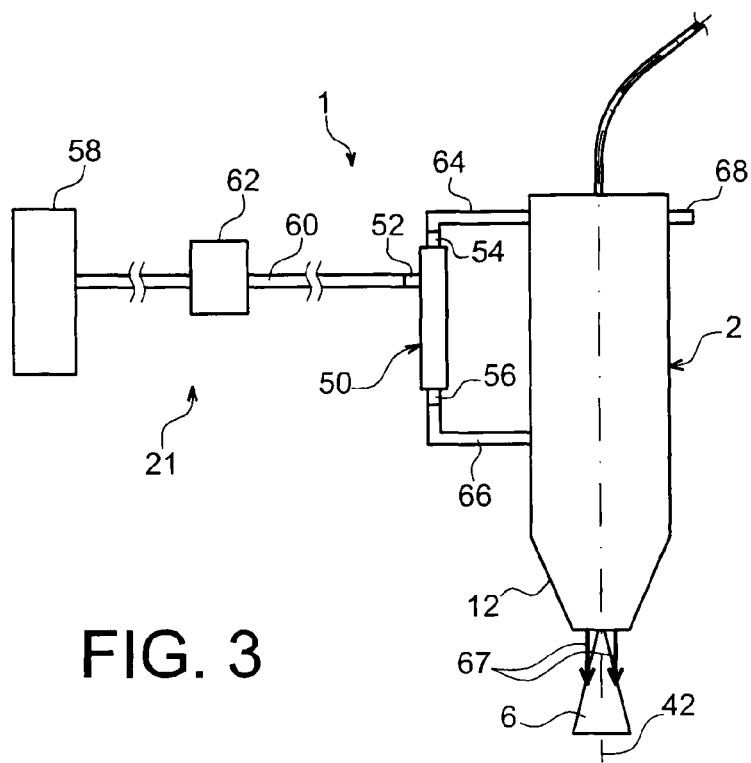
FIG. 3 illustrates a partial front elevation of the cutting installation shown in FIG. 2, in which the cooling device of the laser head has been shown in detail.

In reference now to FIG. 3, one can see the cooling device 21 of the laser head 2 in more detail.

Globally, this comprises a vortex tube 50, known in itself, such as model 3225 by the company EXAIR, for example. The tube 50, having a length which may be in the vicinity of 150 mm, traditionally comprises a compressed air inlet 52, a cold gas outlet 54, and a hot gas outlet 56.

The inlet 52 is connected via a conduit 60 to a compressed gas source 58, which may be the same as the source 36 designed to ensure supplying of the head 20 with working gas. Nevertheless, it must be noted that compressed air is preferred to supply the vortex tube 50, the desired pressure being less than 10 bars, and preferably between 4 and 6 bars. To obtain the desired pressure, a pressure regulator 62 equipped with a filter is placed between the tube 50 and the compressed gas source 58.

Moreover, one can see that the cold gas outlet 54 communicates with the head 2, thanks to a conduit 64 bringing cold gas to an upper part of this laser head 2. Once integrated into the head 2, the cold gas takes a determined path to ensure cooling of the head, before escaping via an ejection vent 68 provided for this purpose.

Similarly, one can see that the hot gas outlet 56 communicates with the head 2, thanks to a conduit 66 bringing the hot gas to a lower part of this laser head 2. Once integrated into the head 2, the hot gas takes a determined path so as to then be able to be ejected from the nozzle tip 12, coaxially to the laser beam 6 as shown by arrows 67 of FIG. 3. In this preferred embodiment, the laser beam axis 42 is consequently identical to the hot gas ejection axis.

As a result, this hot gas jet participates actively in expelling molten metallic particles outside the trench during the cutting operation, together with the working gas jet coming from the head 20.

However, it is indicated that the cutting installation 1 could be such that the gas used to ensure expulsion of the metallic particles is solely made up of the hot gas leaving the nozzle tip 12, in which case the presence of the second head 20 would therefore no longer be necessary. Alternatively, this second head could still be kept, and supplied with gas not from the gas coming from the source 36, but by the hot gas coming from the outlet 56 of the vortex tube 50.

More generally, when it is decided to use only hot gas to ensure the expulsion of molten metallic particles outside the trench, it is preferably done such that this hot gas is ejected identically or similarly to the way described above for the working gas coming from the head 20, in order to fully optimize the cutting performance.

The vortex tube 50 is then designed and adjusted so as to produce approximately 80% cold gas and approximately 20% hot gas, and it is also designed to produce hot gas at a temperature approximately 80 to 100° C. higher than an inlet temperature of the compressed gas, and to produce cold gas at a temperature approximately 20 to 30° C. lower than the inlet temperature of the compressed gas.

As an informational example, the compressed gas is injected at a pressure of approximately 4 bars under a temperature in the vicinity of 25° C., to obtain a cold gas flow of approximately 330 l/min at a temperature of 0° C., and a hot gas flow of approximately 83 l/min at a temperature of 115° C.

Figure 4:
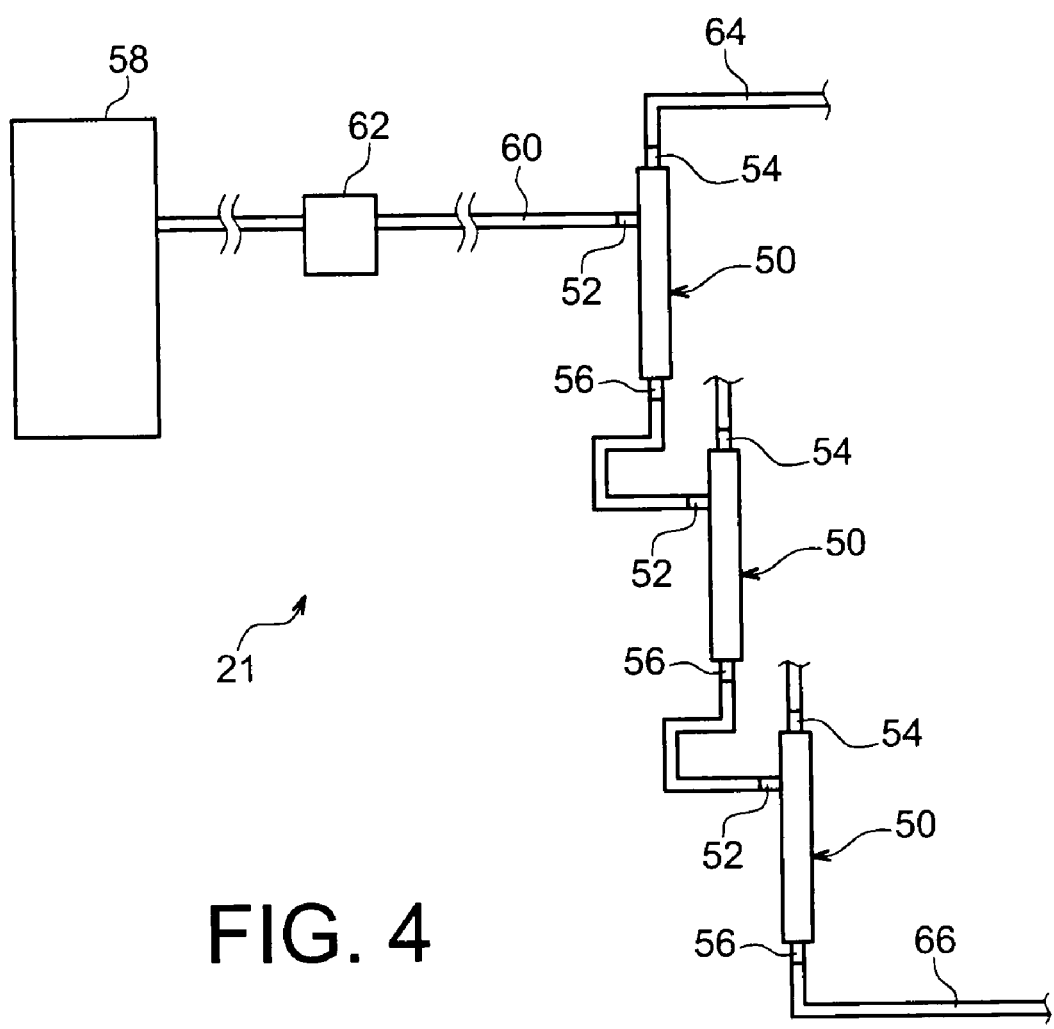
FIG. 4 illustrates a view diagramming an alternative embodiment for the cooling device of the cutting installation shown in FIG. 3.

To be able to increase the temperature of the hot gas leaving the cooling device 21, it is possible to use a plurality of vortex tubes 50 cascade mounted, as shown in FIG. 4. To do this, the first tube 50 is arranged identically to that shown in FIG. 3, with the exception of the fact that its hot air outlet 56 is connected to as to communicate with the compressed gas inlet 52 of the second vortex tube 50. This type of connection is repeated with as many vortex tubes as needed, always providing that the hot gas outlet of one vortex tube supplies the inlet of the vortex tube directly consecutive to it.

Thus, the hot gas outlet 56 of the vortex tube 50 located the farthest upstream in the cascade can be connected to the laser head 2 via the conduit 66 identically to the manner seen with the device 21 in FIG. 3, while the cold gas outlets 54 of the tubes 50 can, for example, each be connected to the conduit 64 going towards the upper part of the laser head.

Figure 5:
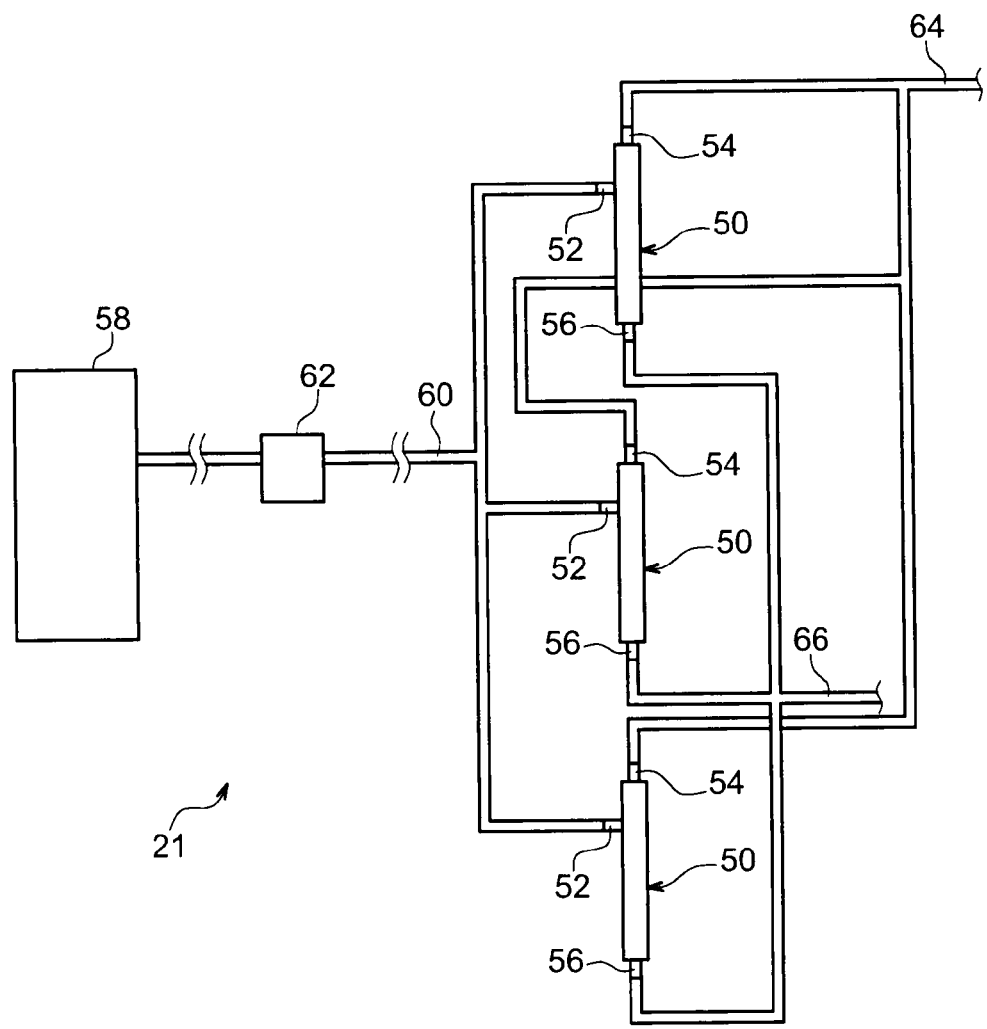
FIG. 5 shows a view diagramming another alternative embodiment for the cooling device of the cutting installation shown in FIG. 3.

When just one vortex tube is sufficient to achieve the desired hot gas and cold gas temperatures, and the flow of these gas jets must be increased, it is then possible to use several vortex tubes 50 mounted in parallel, as shown in FIG. 5.

In this case, each of the inlets 52 is supplied with compressed gas via the conduit 60, the cold gas outlets 54 are all connected to the conduit 64 in the direction of the head 2, while the hot air outlets 56 are connected on the conduit 66 also in the direction of the laser head 2.

Because of this, under the conditions described above integrating three vortex tubes, one obtains a cold gas flow of approximately 3 times 330 l/min at a temperature of 0° C., and a hot gas flow of approximately three times 83 l/min at a temperature of 115° C.

Naturally, in the case where several vortex tubes 50 are used for the device 21, these tubes 50 can be arranged according to a hybrid arrangement of the parallel configuration and the cascade configuration, without going outside the scope of the invention.

Figure 6:
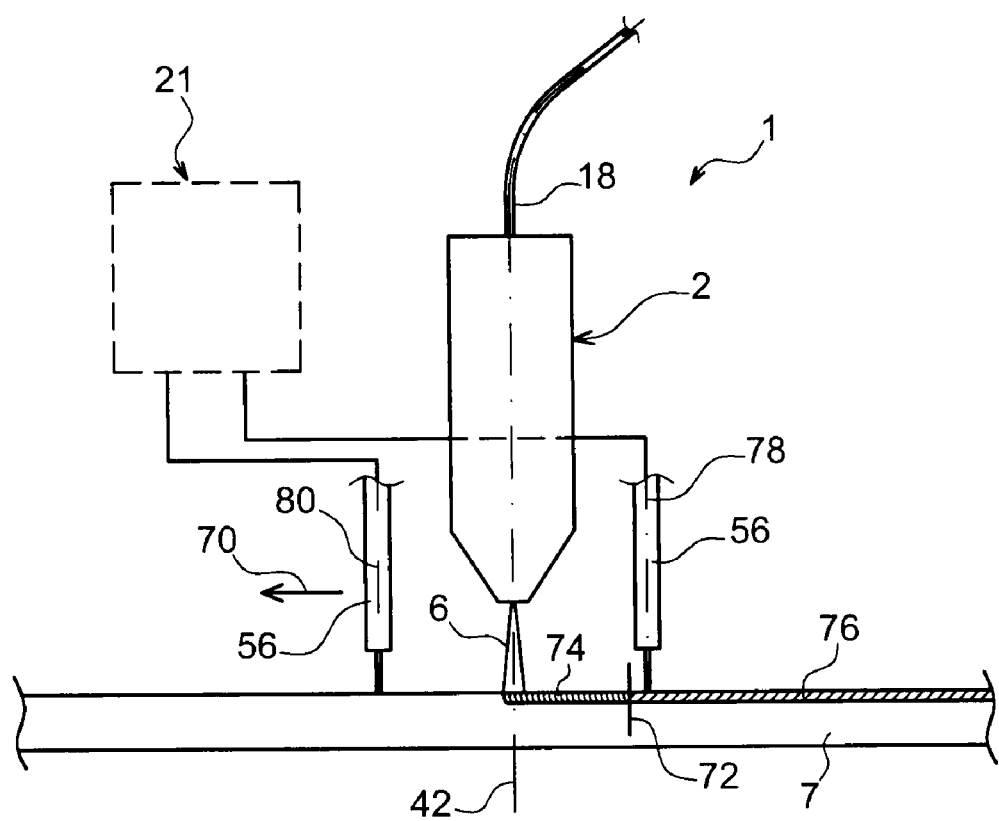
FIG. 6 shows a diagrammatic and partial front elevation view of the welding installation according to a preferred embodiment of the present invention.

The installation 1 shown in FIG. 6 is an installation similar to that shown in the preceding figures, with the difference that it is no longer designed for cutting, but laser welding of pieces 7.

Globally, the laser head 2 is identical to that already described, while the second head 20 is preferably eliminated. The cooling device 21 can assume any of the forms described above, the recovered hot gas then being able to serve for the preheating of the pieces 7, and/or the protection of the solidified solder bath against ambient air.

In the latter case, preferably an inert gas or a gas comprising oxygen and/or carbon dioxide, this type of gas being called "active" and being chosen according to the nature of the materials to be welded, is used so as to be able to protect these from ambient air as well as possible during its solid cooling phase after welding.

As illustrative examples, this may involve an argon- or helium-based binary or compound gas. In the case where the material to be welded is a strongly alloyed steel, the gas can comprise 96.5% argon, 1.5% oxygen and 2% carbon dioxide, or 96% argon, 1% hydrogen and 3% carbon dioxide, while in the case where the material to be welded is a weakly alloyed steel, the gas may comprise 70% argon, 10% oxygen and 20% carbon dioxide.

It is specified that the role of protecting the solidified solder bath, i.e. the part of the weld which evidently comes from the liquid solder bath, but which is already solidified and is in the cooling phase, consists in particular of avoiding the problems of cracking of the materials during this cooling phase, and also avoiding nitriding and oxidation of the welded metal.

To do this, a first hot gas outlet 56 is therefore provided to be located behind the head 2 in the direction of welding 70, and preferably behind the boundary 72 between the liquid solder bath 74, and the solidified solder bath during cooling 76. Of course, the first outlet 56 could be located differently, for example facing the aforementioned boundary 72. As an example, the distance between the laser beam axis 42 and the axis 78 of the first outlet 56 can be between 0 and 40 mm.

Furthermore, one can provide a second hot air outlet 56 to ensure preheating of the pieces 7 to be welded. In this case, this outlet is located in front in relation to the laser head 2 in the direction of welding 70, and the distance between the laser beam axis 42 and the axis 80 of the second outlet 56 can be between 0 and 100 mm.

In the illustrated preferred embodiment, the three axes 56, 42, 78 are located in a same plane, also integrating the weld, and are preferably parallel to each other.

Naturally, one can implement only one of the two outlets 56, depending on the needs encountered for the weld. In the case where both of the aforementioned functions are desired, it is noted that the two outlets 56 are either directly provided on the related vortex tube, or come from a bifurcation (not shown) mounted on the single outlet of the tube. In any case, adapted and conventional means are used making it possible to adjust the distribution of the hot air flow toward these two inlets 56. When the arrangement of FIG. 5 is adopted for the cooling device 21, and therefore a total hot air flow in the vicinity of 240 to 250 l/min is delivered, the distribution is done so as to obtain a hot air flow of at least 230 l/min for preheating, and a hot air flow of less than 20 l/in for protection of the solidified solder bath.

The present invention also concerns a laser cutting/welding method able to be implemented by the installation 1, under the conditions explained above.

The invention has a plurality of applications, including in particular those relative to the nuclear field, and more particularly that of dismantling nuclear installations. One can then cite, as examples, cutting irradiating and/or contaminated elements in a breakage cell, dismantling a cell with the cutting phase of all of its internal installations or very specific interventions on stopped or damaged reactors.

Furthermore, this invention can also be used in the automobile industry or in the naval industry, in which thick sheet metal is widely used. The invention would thus make it possible to supplant the blowtorch and plasma torch techniques traditionally used in this field.

Of course, various modifications can be made by one skilled in the art to the installation and the laser cutting/welding method just described, solely as non-limiting examples.

The invention claimed is:

1. A laser cutting/welding installation comprising:
a laser head configured to deliver a laser beam, the laser beam designed to generate a hot spot on a workpiece by incidence thereon and form a solder bath from a portion of the workpiece affected by the hot spot; and
a cooling device of the laser head, wherein:
the cooling device comprises at least one vortex tube, the at least one vortex tube including at least one compressed gas inlet supplied with a compressed gas, at least one cold gas outlet, and at least one hot gas outlet,
the at least one compressed gas inlet is in fluid communication with the at least one cold gas outlet and the at least one hot gas outlet, and
the at least one cold gas outlet is plumbed directly to an interior volume of the laser head and configured to deliver a cold gas directly to the interior volume of the laser head for cooling thereof.

2. The installation according to claim 1, wherein the at least one vortex tube consists of a plurality of vortex tubes.

3. The installation according to claim 2, wherein at least two of the plurality of vortex tubes supplied with the compressed gas are mounted in parallel.

4. The installation according to claim 2, wherein:
the plurality of vortex tubes supplied with the compressed gas, includes a first vortex tube and a second vortex tube, and
a hot gas outlet of the first vortex tube supplies a compressed gas inlet of the second vortex tube.

5. The installation according to claim 1, wherein the vortex tube is configured such that approximately 80% of a compressed gas flow entering the at least one compressed gas inlet exits the vortex tube through the at least one cold gas outlet and approximately 20% of the compressed gas flow entering the at least one compressed gas inlet exits the vortex tube through the at least one hot gas outlet.

6. The installation according to claim 1, wherein:
the vortex tube is configured to produce a hot gas temperature at the at least one hot gas outlet approximately 80° to 100° C. higher than a compressed gas temperature at the at least one compressed gas inlet, and
the vortex tube is configured to produce a cold gas temperature at the at least one cold gas outlet approximately 20° to 30° C. lower than the compressed gas temperature at the at least one compressed gas inlet.

7. The installation according to claim 1, wherein the installation is a laser cutting installation.

8. The installation according to claim 7, wherein a hot gas flow leaving the at least one hot gas outlet of the at least one vortex tube is configured to expel molten metallic particles outside a solder bath created by the laser beam incident on the workpiece.

9. The installation according to claim 8, wherein the at least one hot gas outlet of the at least one vortex tube is connected to the laser head such that the hot gas is ejected by a nozzle tip attached to the laser head.

10. The installation according to claim 9, wherein the laser beam passes through the nozzle tip.

11. The installation according to claim 7, wherein the compressed gas is compressed air.

12. The installation according to claim 1, wherein the installation is a laser welding installation.

13. The installation according to claim 12, wherein the hot gas flow leaving the at least one hot gas outlet of the at least one vortex tube preheats parts to be welded.

14. The installation according to claim 13, wherein the at least one hot gas outlet of the at least one vortex tube is located in front of the laser head in relation to a direction of welding.

15. The installation according to claim 12, wherein the hot gas flow leaving the at least one hot gas outlet of the at least one vortex tube displaces ambient air away from a solidified solder bath against to protect the solidified solder bath from ambient air.

16. The installation according to claim 15, wherein the at least one hot gas outlet of the at least one vortex tube is located behind the laser head in relation to a direction of welding.

17. The installation according to claim 12, wherein the hot gas flow leaving the at least one hot gas outlet of the at least one vortex tube preheats the parts to be welded, and displaces ambient air away from a solidified solder bath to protect the solidified solder bath from ambient air.

18. The installation according to claim 12, wherein the compressed gas is an inert gas.

19. A laser cutting/welding method, comprising:

cutting or welding a workpiece using a laser cutting/welding installation, wherein the laser cutting/welding installation includes:

a laser head configured to deliver a laser beam, the laser beam designed to generate a hot spot on a workpiece by incidence thereon and form a solder bath from a portion of the workpiece affected by the hot spot; and a cooling device of the laser head, wherein:

the cooling device comprises at least one vortex tube, the at least one vortex tube including at least one compressed gas inlet supplied with a compressed gas, at least one cold gas outlet, and at least one hot gas outlet, the at least one compressed gas inlet is in fluid communication with the at least one cold gas outlet and the at least one hot gas outlet, and the at least one cold gas outlet is plumbed directly to an interior volume of the laser head and configured to deliver a cold gas directly to the interior volume of the laser head for cooling thereof.

20. The installation according to claim 12, wherein the compressed gas includes at least one of oxygen or carbon dioxide.

* * * * *